3,347,658
HERBICIDAL COMPOSITION AND METHOD EMPLOYING DICYCLOALKYLUREAS
Raymond W. Luckenbaugh, Wilmington, Del., assignor to E. I. du Pont de Nemours and Company, Wilmington, Del., a corporation of Delaware
No Drawing. Filed Aug. 16, 1966, Ser. No. 572,691
10 Claims. (Cl. 71—119)

ABSTRACT OF THE DISCLOSURE

A compound of the formula:

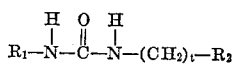

wherein $R_1$ and $R_2$ are cycloalkyl, bicycloalkyl, substituted cycloalkyl and bicycloalkyl:
$t$ is 0 or 1, with the limitation that when $t$ is 0, $R_1$ and $R_2$ must be different and when $t$ is 0 and additionally $R_1$ and $R_2$ are both unsubstituted cycloalkyl, the ring size must differ by more than one carbon atom.
Typical is 1-cyclohexyl-3-cyclohexylmethylurea useful for selectively controlling annual grasses in the presence of perennial grasses.

---

This application is a continuation-in-part of my application Ser. No. 452,013, filed Apr. 29, 1965, which is in turn a continuation-in-part of my application Ser. No. 278,418, filed May 6, 1963, both now abandoned.

This invention relates to dicycloalkylureas. More specifically, this invention relates to unsymmetrical 1,3-dicycloalkylureas and to their use in compositions and methods for retarding the growth of germinating and seedling weed grasses.

I have discovered compounds of the following formula:

(I)

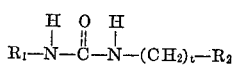

wherein $t$ is 0 or 1;
$R_1$ and $R_2$ are different when $t$ is 0, the same or different when $t$ is 1 and are cycloalkyl of 5 through 8 carbon atoms differing by more than one carbon atom when $t$ is 0, bicycloalkyl of 7 through 8 carbon atoms or monomethyl, dimethyl, monohalo, dihalo or monomethylmonohalo substituted saturated cycloalkyl of 5 through 8 carbon atoms or substituted saturated bicycloalkyl of 7 through 8 carbon atoms.

Compounds of Formula I control the growth of annual weed grasses without injuring most broadleaf plants and perennial grasses. This effect is remarkable in view of the fact that a symmetrical 1,3-dicycloalkylurea such as 1,3-dicyclohexylurea does not produce this effect at rates as high as sixteen pounds per acre.

Excellent growth retardant effects on annul grasses are obtained from compounds of the formula:

(II)

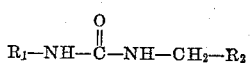

wherein $R_1$ and $R_2$ have the same meaning as in Formula I.

Outstanding growth retardant effects on annual grasses are obtained from compounds of the formula:

(III)

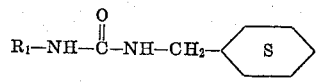

wherein $R_1$ has the same meaning as in Formula I.

An outstanding feature of the unsymmetrical 1,3-dicycloalkylureas used in this invention is their truly selective pre-emergence elimination of several annual seedling grasses from other grasses. For example, treatment at the time of seeding a new turf will control crabgrass and some other annual grasses without injury to the germinating seeds of common temperature-region turf species.

In addition to the annual weed grasses some perennial weed plants such as Johnson grass, Bermuda grass and the like are controlled when the perennial is growing from a seed. However, when the perennial has developed rhizomes a compound used in this invention has little effect on the plant. A home lawn owner desiring a Kentucky bluegrass, creeping fescue or bentgrass lawn when his neighbor has an established Bermuda grass lawn can successfully apply a compound of this invention to retard the growth of invading Bermuda grass from seeds while not worrying about affecting his neighbor's established lawn. Similarly, spring applications of a compound of this invention to an established lawn consisting of perennial grasses will prevent the encroachment of crabgrass from adjacent areas.

The following representative list sets forth weed grass plants exhibiting retarded growth approximately two weeks after a pre-emergence application of a compound used in this invention.

| Common name: | Gramineae |
|---|---|
| Crabgrass | Digitaria spp. |
| Annual brome | Bromus brizaeformis |
| Downy brome or cheat | Bromus tectorum |
| Pearlmillet | Pennisetum glaucum |
| Johnson grass | Sorghum halepense |
|  | Sorghum almum |
| Sudan grass | Sorghum sudanense |
| Barnyard grass | Echinochloa crusgalli |
| Giant foxtail | Setaria faberii |
| Nimblewill | Muhlenbergia schreiberi |

An annual grass is defined in the Journal of the Weed Society of America, vol. 10, #3, July 1962, as any grass plant that completes its life cycle from seed in one year.

For the purposes of this specification, the plants of the above list including the annual weed grasses and perennial weed grasses growing from seed such as Bermuda grass, nimblewill and Johnson grass are stated generically to be "seedling weed grasses."

Weeds are defined as any unwanted plant. For the purposes of this specification it is assumed that annual grasses that are commonly cultivated such as ryegrass, wheat, barley and oats are not weeds.

A wide range of plants are not seriously injured by the compounds used in this invention. Accordingly, the above weeds are controlled selectively, i.e., without substantial adverse effect on the majority of species in the plant kingdom. Examples of vegetation that are not seriously injured by the compounds used in my invention include the turf grasses described above; ornamentals such as marigolds, tulips, arbor vitae, azalea, boxwood, camellia, flowering crab, deutzia, forsythia, Chinese holly, Japanese holly, Tartarian honeysuckle, privet, pyracantha, climbing rose, tea rose, spiraea and other shrubs; trees such as oaks, Q. alba, Q. borealis and Q. velutina, beech, dogwood, hickory, Norway spruce, black gum, sweet gum, tulip tree, maple and pine.

Established plants of many plant species particularly those past the three leaf stage are not affected by the compounds used in my invention.

Preparation

Two methods are generally used to prepare the compounds of this invention. They are described by the following general reaction equations:

A.

The cycloalkyl or bicycloalkylamine is dissolved in an inert solvent such as n-hexane, toluene, dioxane or the like and reacted with the corresponding cycloalkylisocyanate at normal temperatures, for example 10–100° C., preferably at 25–45° C.

B.
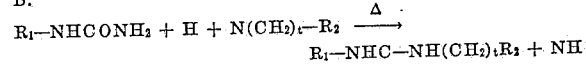

The reactants are fused until the evolution of ammonia ceases. The residue consists of crude product which can be purified by recrystallization from a polar solvent such as acetonitrile.

The method for making the amino intermediates for the manufacture of other compounds used in this invention can be made by consulting Beilstein 12 (I) page 113 to page 118 (1933). This reference describes the manufacture of the following intermediates: cyclopentylamine, cyclohexylamine, 3-amino-1-methylcyclopentane and cyclooctylamine. On pages 7 to 10 of Beilstein 12 (1929), the preparation of the following intermediates is described: 1 - amino - 1 - methylcyclopentane, 2-amino-1-methylcyclopentane, cycloheptylamine and 1-amino-1-methylcyclohexane. The following intermediates can be made by consulting Beilstein 12 (II) pages 14 to 22 (1950):

2-chloro-1-aminocyclohexane
2-bromo-1-aminocyclohexane
3-bromo-1-aminocyclohexane
2-amino-1-methylcyclohexane (cis and trans)
3-amino-1-methylcyclohexane (cis and trans)
4-amino-1-methylcyclohexane (cis and trans)
2-amino-1,3-dimethylcyclohexane (cis, cis, cis)
2-amino-1,3-dimethylcyclohexane (cis, cis, trans)
4-amino-1,3-dimethylcyclohexane (trans, cis, trans)
5-amino-1,3-dimethylcyclohexane (cis, cis, cis)
2-amino-1,4-dimethylcyclohexane (cis, cis, cis)
2-amino-1,4-dimethylcyclohexane (cis, cis, trans)
2-amino-1,4-dimethylcyclohexane (trans, cis, trans)

Bicyclic amines are readily accessible from diene adducts. Some examples of bicyclic amine intermediates are as follows:

Adler et al., Ber., 71B, 2451 (1938)
   endo norbornylamine
   exo norbornylamine
   3-methylnorbornylamine
Semmler et al., Ber., 41, 866; and Ber., 41, 127
   4-amino-2-methylbicyclo[1,2,3]octane
   2-amino-1,7-dimethylbicyclo[1,2,2]heptane
Komppa, Ann., 366, 75
   3-amino-2,2-dimethylbicyclo[1,2,2]heptane
Beilstein, 12, 1st supplement, 125 (1933)
   5-amino-2,2-dimethylbicyclo[1,2,2]heptane
Seka et al., Ber., 75, 1379
   2-amino-bicyclo[2,2,2]octane
Komppa et al., Ann., 512, 172
   2-aminobicyclo[1,2,2]heptane The ring halogenated amines can be prepared by the procedure described in British Patent 885,878, published Dec. 28, 1961. This consists of halogenation of the hydrogen halide or sulfate salts in carbon tetrachloride. The exact position of the halogen is not known. Mono and dihalogenated products are obtained by controlling the amount of halogen added. Also, 1-cycloalkyl-3-hydroxy-cycloalkylureas can be converted to the 1-cycloalkyl-3-chlorocycloalkylureas with thionyl chloride at 0–40° C. in an inert solvent.

Compositions

Compositions of this invention comprise a compound of Formula I together with one or more surface-active agents.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1964) by John W. McCutcheon, Inc.

Suitable surface-active agents for use in compositions of the present invention are: polyethylene glycol fatty esters and fatty alkylol amide condensates, alkylaryl sulfonates, fatty alcohol sulfates, dialkyl esters of sodium sulfosuccinate, fatty acid esters of sodium isethionate, polyoxyethylene thioethers and long chain quaternary ammonium chloride compounds.

Surface-active dispersion agents such as sodium lignin sulfonates, low viscosity methyl cellulose, polymerized sodium salts of alkylnaphthalene sulfonic acids are also suitable in the growth retardant compositions of this invention.

Among the more preferred surfactants are the anionic and non-ionic type. Among the anionic surface-active agents, preferred ones are alkali metal or amine salts of alkylbenzene sulfonic acids, such as dodecylbenzene sulfonic acid, sodium lauryl sulfate, alkylnaphthalene sulfonates, sodium N methyl-N-oleoyltaurate, oleic acid ester of sodium isethionate, dioctyl sodium sulfosuccinate, sodium dodecyldiphenyloxide disulfonate. Among the non-ionic compounds, preferred members are alkylphenoxy poly(ethyleneoxy)ethanols such as nonylphenol adducts with ethylene oxide; trimethylnonyl polyethylene glycol ethers, polyethylene oxide adducts of fatty and rosin acids, long chain alkylmercaptan adducts with ethylene oxide and polyethylene oxide adducts with sorbitan fatty acid esters.

In general, less than 10% by weight of the surface-active agent will be used in compositions of this invention and ordinarily the amount of surface-active agents will range from 1–5% but can be even less than 1% by weight.

Additional surface-active agents can be added to the above formulation to increase the ratio of surface-active agent:active agent up to as high as 5:1 by weight. Normally the purpose of adding higher amounts of surfactant is to increase the growth retardant effect of the active compounds. When used at higher rates it is preferred that the surfactant be present in the range of one fifth to five parts surfactant for each one part of active agent.

Plant growth retardant compositions of this invention can contain, in addition to the surfactant, finely divided inert diluents such as talcs, natural clays, including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybeans and cottonseed. The amount of the finely divided inert solid diluent can vary widely but will generally range from 10 to 98% by weight of the growth retardant composition. The particle size can vary considerably, but will ordinarily be somewhat under 50 microns in the finished formulation.

Compositions of these plant growth retardants and inert solid diluent can also be formulated into granules and pellets. In such compositions, the diluent will generally range from 65 to 99% and the active ingredient can range from 1 to 35%. It should be understood that it will not be necessary to include a surfactant in the granular and pelletized compositions.

To prepare granules the active compound can be dissolved in a solvent, and this solution can be sprayed over pre-formed clay granules, expanded vermiculite or the like to distribute the active ingredients over and throughout the granular mass. Such granules can range in particle size of from +60 mesh to +4 mesh, and an active ingredient content of 1 to 6% is preferred. It is also possible to make such granules by mixing the finely divided diluents and finely divided growth retarding compound, for instance by grinding together, and then forming granules by adding water, tumbling and drying the resulting spheres.

Pellets can be prepared by extruding a mixture that comprises the dicycloalkylurea growth retardant, pelleting clay diluent and water in strands, cutting these, and drying the product. Pellet size can range from 10 mesh to larger shapes such as ⅜ inch cubes. Pellets preferably contain from 5 to 35% of the compound of Formula I. In addition to the diluents, pelletized and granular compositions can contain additives such as binders, surfactants and the like.

In addition to the formulation described above, sand ground formulations can be prepared using the method described in Hochberg U.S. Patent 2,581,414, issued Aug. 19, 1948. Using the methods described in this patent fine particles of the active compounds within the scope of this invention will be dispersed evenly in a diluent.

Emulsifiable oils also can be employed as carriers with one or more of the compounds of Formula I. In these plant growth regulant compositions the active ingredient, together with a surface-active agent and an oil, form a liquid which can be conveniently poured and measured. Such compositions can be mixed with water at the point of application to form an emulsion containing the herbicide and the surface-active agent. Such compositions have the advantage that the oil will often act as a foam inhibitor and thus reduce the tendency for large amounts of surfactant to form objectionable foam. The oil used, such as toluene, kerosene, Stoddard solvent, xylene, alkylated naphthalenes, diesel oil and the like should be preferably water immiscible.

It is desirable on occasion to add water soluble cosolvents such as dimethylformamide, dimethylacetamide, dimethyl sulfoxide, N-methylpyrrolidone, methyl isoamylketone and the like. It is usually desirable to choose the oil so that one of two conditions prevail. In one instance the active agent will be soluble in the amounts used in particular formulations and a solution results. In the other instance the active agent will be substantially insoluble in the oil carrier, so that the composition consists of finely divided particles dispersed in the surfactant/oil mixture.

In these emulsifiable oil concentrates, the compound of Formula I will be present in amounts ranging from 10 to 35% by weight. Precise concentrations of active agent, of course, will depend on the intended use of the composition. When mixed with water at the point of application, the oil concentrate will be diluted so that in the final formulation the active agent will be present in amounts ranging from 0.25 to 2% by weight.

It is possible to use such oil solutions of dicycloalkylureas by extending them with other oils, for example, diesel oil, herbicidal oil, and the like for applications such as railroad rights-of-way.

*Application*

The compounds of this invention can be applied directly to the soil as pre-emergence or as post-emergence treatments to plant foliage, or they can be mixed intimately with the soil. Rates of application will usually be in the range of ½ to 20 pounds per acre, and will preferably be used at the rate of 1 to 15 pounds per acre.

More specifically, as a pre-emergence application on turf, 2 to 8 pounds per acre of a compound used in this invention will retard the growth of crabgrass, barnyard grass, foxtail, millet and Johnson grass and Bermuda grass growing from seed. The seedling weeds usually make an appearance above ground, and then fail to develop showing symptoms of severe growth retardation. It is particularly surprising to note that the compounds of Formula I will retard annual grass weeds such as crabgrass, barnyard grass and foxtail without harming cultivated annual grasses such as ryegrass.

After an application of four to sixteen pounds of active ingredient per acre on areas where perennial grasses are established and at a time before the weeds appear barnyard grass, crabgrass, millet and foxtail weed growth is severely retarded. There is no injury to establish Kentucky bluegrass, bentgrass, creeping red fescue, Kentucky 31 fescue or Bermuda grass growing from rhizomes. The weeds make an appearance above the ground and then fail to develop.

After a pre-emergence application of two to eight pounds per acre of active ingredient on areas seeded with perennial grasses at a time before the perennial grasses and weeds have appeared, development of crabgrass, barnyard grass and foxtails is severely retarded. There is no undesirable effect on the development of such perennials as Kentucky bluegrass, bentgrass or creeping red fescue.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro - 1,4,5,8-dimethanonaphthalene (Dieldrin), 1–2 pounds per acre 1,2,4,5,6,7,8,8-octachloro-4,7-methano-3a,4,7,7a-tetrahydroindane (Chlordane), 2.5–10 pounds per acre 1,1,1-trichloro-2,2-bis(p-methoxyphenyl)ethane (Methoxychlor), 2–4 pounds per acre 1,1,1-trichloro-2,2-bis(p-chlorophenyl)ethane (DDT), 10–20 pounds per acre and 1-naphthyl-N-methylcarbamate ("Sevin"), 2–4 pounds per acre.

Fungicides that can be used in conjunction with the compounds of this invention include:

metal salts of ethylene bisdithiocarbamic acid, e.g. sodium, manganese, zinc and iron salts;
N-trichloromethylmercapto-4-cyclohexene-1,2-dicarboximide;
phenylmercury acetate;
inorganic mercury salts;
methylmercury dihydroxypropyl mercaptide;
methylmercury acetate;
N-trichloromethylthiophthalimide;
2,3-dichloro-1,4-naphthoquinone;
2,3,5,6-tetrachloro-1,4-benzoquinone;
2,4-dichloro-6-(o-chloroanilino)-s-triazine;

Copper A:

metal salts of alkyl and dialkyl dithiocarbamic acid, e.g. Zn, Na, K, Fe, Mn, Ni;
zinc pyridinethione;
S-(1-oxido-2-pyridyl)-isothiuronium chloride;
tetrachloroisophthalonitrile;
tetramethylthiuram disulfide;
hydroxymercurichlorophenol and mixtures of these last two, and methyl mercury dicyandiamide.

When present in compositions of this invention the above-described fungicides will be present at the rate of .02 to 10 parts by weight based on the weight of the compounds of Formula I present in the composition.

The control of annual weed grasses with compound of Formula I often can be advantageously accomplished together with conventional herbicides in situations where the annual weed grasses are growing with weeds controlled by the second herbicide.

Illustrative of herbicides that can be used in conjunction with the compounds of this invention in sprays and granular formulations to take weeds out of desirable plants are the following:

| Lbs./Acre | Herbicide | Desirable Plants |
|---|---|---|
| 1-3 | 2,4-dichlorophenoxyacetic acid. | Roadside and lawn turf grasses. |
| 0.3-1 | 2,4,5-trichlorophenoxyacetic acid. | Roadside and lawn turf grasses. |
| 0.5-1.5 | 2,4,5-trichlorophenoxy- propionic acid. | Roadside and lawn turf grasses. |
| 1-4 | 1-n-butyl-3-(3,4-dichloro- phenyl)-1-methylurea. | Ornamentals and lawn turf grasses. |
| 1-3 | 2-chloro-4,6-bis(ethylamino)- s-triazine. | Ornamentals. |
| 1-4 | 1,2-dihydropyridazine-3,6- dione. | Roadside turf grasses. |
| 5-15 | O-(2,4-dichlorophenyl)-O- methyl isopropylphosphor- amidothioate. | Roadside and lawn turf grasses. |
| 1-3 | Octyl dodecyl ammonium salts of methyl arsonate. | Turf. |
| 1-3 | Disodium methylarsonate | Do. |
| 1-5 | Dimethyl ester of tetra- chloro terephthalic acid. | Do. |

The amount of second herbicide set forth in the left column is in addition to the heretofore indicated dosage of compounds of Formula I.

The above can be in the form of salts or non-volatile ester formulations. Also contact herbicides can be included, such as cacodylic acid, potassium cyanate, dinitro-sec.-butyl phenol, 1,1'-ethylene-2,2'-dipyridylium dibromide (diquat) and 1,1'-dimethyl-4,4'-bipyridylium dichloride (paraquat).

Fertilizers commonly called plant nutrients also can be applied together with the compounds used in this invention. The plant nutrients include the commonly used compounds of nitrogen, phosphorus, and potassium, i.e. ammonium sulfate, ammonium nitrate, urea, methylene ureas, low molecular weight urea-formaldehyde polymers, sodium nitrate, anhydrous ammonia, aqueous ammoniacal solutions of urea or ammonium nitrate, aqueous solutions of urea or ammonium nitrate, ammonium phosphates, superphosphates, triple superphosphates, phosphoric acid and the potassium salts such as the chloride, sulfate and nitrate. The plant nutrients are applied individually or in a mixture with each other as so-called "complete mixtures" of N-P-K which can also contain one or more of the "trace element" plant nutrients; i.e., manganese, zinc, iron, boron, magnesium, etc.

It is understood that the compounds and compositions of this invention are applied to the "locus" of the undesirable weeds. By "locus" is meant the plant itself when visible above the ground and when the plant is not visible, the immediate area of soil where the undesirable plant is developing.

The following additional examples, in which all percents unless otherwise indicated are by weight, are provided to more clearly explain this invention.

EXAMPLE 1

A solution of 11.3 grams of 2-methylcyclohexylamine (cis-trans mixture) in 100 ml. of n-hexane is treated with 12.5 grams of cyclohexylisocyanate in 25 ml. of n-hexane for three hours. The residue is taken up in boiling acetonitrile, treated with charcoal, filtered hot and then allowed to cool. Yield is fourteen grams of a white powder melting at 197-213° C. The material is recrystallized again from acetonitrile (500 ml.) to yield 9.5 grams of a mixture of cis and trans 1-(2-methylcyclohexyl)-3-cyclohexyl urea, M.P. 212-224° C.

*Analysis.*—Calc'd. for $C_{14}H_{26}N_2O$: N, 11.8%. Found: N, 11.7%.

By the above procedure using the following amines and cycloalkylisocyanates the corresponding dicycloalkylureas are obtained:

TABLE I

| Cycloalkylisocyanate | Amine | Urea |
|---|---|---|
| Cyclohexylisocyanate | Cyclooctylamine | 1-cycloheyxl-3-cyclooctylurea (M.P. 197-197.5° C.) |
| Cyclohexylisocyanate | 2-chlorocyclohexylamine | 1-(2-chlorocyclohexyl)-3-cyclohexylurea. |
| Cyclopentylisocyanate | 2-bromocyclohexylamine | 1-(2-bromocyclohexyl)-3-cyclopentylurea. |
| Cycloheptylisocyanate | 3-bromocyclohexylamine | 1-(3-bromocyclohexyl)-3-cycloheptylurea. |
| Cyclooctylisocyanate | Dichlorocyclohexylamine | 1-(dichlorocyclohexyl)-3-cyclooctylurea. |
| 2-methylcyclohexylisocyanate | 2-iodocyclohexylamine | 1-(2-iodocyclohexyl)-3-(2-methylcyclohexyl)urea. |
| Cyclohexylisocyanate | Norbornylmethylamine | 1-(2-norbornylmethyl)-3-cyclohexylurea. |
| Cyclohexylisocyanate | Bicyclooctylamine | 1-(bicyclooctyl)-3-cyclohexylurea. |
| 2-methylcyclohexylisocyanate | Hexahydrobenzylamine | 1-(cyclohexylmethyl)-3-(2-methylcyclohexyl) urea (M.P. 101-121° C.). |
| 2-methylcyclohexylisocyanate | 2-methylcyclohexylmethylamine | 1-(2-methylcyclohexyl)-3-(2-methylcyclohexylmethyl)-urea (M.P. 115-165° C.). |
| 2-methylcyclohexylisocyanate | Chloronorbornylamine | 1-chloronorbornyl-3-(2-methylcyclohexyl)urea. |
| Cyclohexylisocyanate | 3-amino-2,2-dimethylbicyclo-[3.2.1]octane | 1-cyclohexyl-3-(2,2-dimethylbicyclo[3.2.1]oct-3-yl)urea. |
| Cycloheptylisocyanate | 2-aminobicyclo[3.2.1]octane | 1-cycloheptyl-3-bicyclo[3.2.1] oct-2-ylurea. |
| Cyclooctylisocyanate | 2-aminobicyclo[2.2.2]octane | 1-cyclooctyl-3-bicyclo[2.2.2]oct-2-ylurea. |
| Cyclohexylisocyanate | 2-aminomethylbicyclo[2.2.2]octane | 1-cyclohexyl-3-bicyclo[2.2.2]oct-2-ylmethylurea. |
| Cyclooctylisocyanate | 2-aminomethylbicyclo[3.2.1]octane | 1-cyclooctyl-3-bicyclo[3.2.1]oct-2-ylmethylurae. |

EXAMPLE 2

A solution of 11.3 g. of hexahydrobenzylamine, B.P. 98°/mm., in 100 ml. of n-hexane is treated with 12.5 grams of cyclohexylisocyanate for 2.5 hours. The precipitate is filtered, washed with n-pentane, and air dried. There is obtained 21 grams of essentially pure 1-cyclohexyl-3-(cyclohexylmethyl)urea, M.P. 153.5-155° C.

*Analysis.*—Calc'd. for $C_{14}H_{26}H_2O$: N, 11.7%. Found: N, 11.8%.

EXAMPLE 3

Eleven and two-tenths grams of cyclopentylurea is treated with eleven and three-tenths grams of 2-methylcyclohexylamine for two hours, the temperature rising from 28° C. to 265° C. The yellowish waxy material is taken up in boiling acetonitrile and then filtered. There is obtained 9.0 grams of 1-cyclopentyl-3-(2-methylcyclohexyl)-urea, M.P. 184-188° C.

*Analysis.*—Calc'd. for $C_{13}H_{24}N_2O$: N, 12.5%. Found: N, 10.9%.

By the procedure of Example 3 using the following amines the indicated dicycloalkylureas can be prepared:

TABLE II

| Starting Urea | Amine | Urea |
|---|---|---|
| Cyclohexylurea | 2-methylcyclo-pentylamine | 1-(2-methylcyclopentyl)-3-cyclohexylurea. |
| Cycloheptylurea | Clorocyclopentylamine | 1-(chlorocyclopentyl)-3-cycloheptylurea. |
| Cyclooctylurea | Dichlorocyclopentylamine | 1-(dichlorocyclopentyl)-3-cyclooctylurea. |
| Cyclopentylurea | Bromocyclopentylamine | 1-(bromocyclopentyl)-3-cyclopentylurea. |
| Cycloheptylurea | Hexahydrobenzylamine | 1-(cyclohexylmethyl)-3-cycloheptylurea (M.P. 165–168° C.). |
| Do | 3-methylcyclohexylamine | 1-cycloheptyl-3-(3-methylcyclohexyl)urea (M.P. 174–177° C.). |
| Cyclohexylurea | 2-norbornylamine | 1-cyclohexyl-3-(2-norbornyl)urea. |
| Do | 2-norbornylmethylamine | 1-cyclohexyl-3-(2-norbornylmethyl)urea. |
| Do | 3-methyl-2-norbornylamine | 1-cyclohexyl-3-(3-methyl-2-norbornyl)urea. |
| Do | 1,7-dimethyl-2-norbornylamine | 1-cyclohexyl-3-(1,7-dimethyl-2-norbornyl)urea. |
| Do | 1-aminobicyclo[2.2.2]octane | 1-cyclohexyl-3-(1-[2.2.2]bicyclooctyl)urea. |

EXAMPLE 4

Twelve and seven-tenths grams of cyclooctylamine is treated with eleven and two-tenths grams of cyclopentylurea in a micro-lab flask with a water condenser. Heat is applied to the flask in a bath. The reaction requires seven hours and the temperature increases from 25–175° C. The pot content is poured into n-hexane where it crystallizes. A yield of 9.1 grams of essentially pure 1-cyclopentyl-3-cyclooctylurea (M.P. 155–156° C.) is obtained.

*Analysis.*—Calc'd. for $C_{14}H_{26}N_2O$: N, 11.7%. Found: N, 11.6%.

TABLE III

Using the procedure described in Example 4 the following cycloalkylureas can be prepared:

| Starting Urea | Amine | Product |
|---|---|---|
| Cyclopentylurea | 2-methylcyclopentylamine | 1-(2-methylcyclopentyl)-3-cyclopentylurea. |
| Do | 2-methylcyclohexylamine | 1-(2-methylcyclohexyl)-3-cyclopentylurea (M.P. 189–189.5° C.). |
| Do | 3-methylcyclohexylamine | 1-(3-methylcyclohexyl)-3-cyclopentylurea (M.P. 125.5–133° C.). |
| Cyclohexylurea | 2-methylcyclohexylmethylamine | 1-cyclohexyl-3-(2-methylcyclohexylmethyl)urea (M.P. 100–108° C.). |
| Cyclooctylurea | 2-methylcyclohexylmethylamine | 1-cyclooctyl-3-(2-methylcyclohexylmethyl)urea. |
| Do | Hexahydrobenzylamine | 1-cyclooctyl-3-(cyclohexylmethyl)urea (M.P. 135–135.5° C.). |

EXAMPLE 5

Twelve and seven-tenths grams of 4-amino-1,3-dimethylcyclohexane dissolved in 125 milliliters of n-hexane is treated with twelve and five-tenths grams of cycloisocyanate in 25 milliliters of n-hexane. The reaction materials are filtered through a sintered funnel, washed with pentane and then allowed to air dry. This material is taken up in ethanol, treated with charcoal, and filtered hot. The yield is 8.7 grams of a white powder consisting of 1-cyclohexyl-3-(1,3-dimethylcyclohexyl)urea, M.P. 217.5–221° C.

*Analysis.*—Calc'd. for $C_{15}H_{28}N_2Cl$ (252): N, 11.1%. Found: N, 11.0%.

EXAMPLE 6

Eleven and three-tenths grams of 3-methylcyclohexylamine dissolved in 100 milliliters of n-hexane is treated with twelve and five-tenths grams of cyclohexylisocyanate. The reaction materials are filtered through a sintered funnel, washed with pentane and then allowed to air dry. The material formed is recrystallized from acetonitrile. The yield is 7.2 grams of 1-cyclohexyl-3-(3-methylcyclohexyl)urea, M.P. 197–198° C.

*Analysis.*—Calc'd. for $C_{14}H_{25}N_2O$ (237): N, 11.8%. Found: N, 11.7%.

EXAMPLE 7

Eleven and two-tenths grams of cyclopentylurea is treated with eleven and three-tenths grams of hexahydrobenzylamine. Materials are combined in a micro-lab flask fitted with reflux condensers and heated with a silicone oil bath. Some ammonia evolved from the solution. The materials are removed from the flask, treated with 50 ml. of pentane, and filtered through a sintered funnel and sucked dry. The material is taken up in 300 cc. of boiling acetonitrile, treated with charcoal and filtered hot. A yield of 21.3 grams of 1-(cyclohexylmethyl)-3-cyclopentylurea, M.P. 104–105° C. is obtained.

*Analysis.*—Calc'd. for $C_{13}H_{24}N_2O$ (224): N, 12.5%. Found: N, 11.0%.

EXAMPLE 8

The following granular formulation can be used for most solid dicycloalkylureas used in this invention. A wettable powder is first prepared by micropulverizing ingredients such as the following:

| | Percent |
|---|---|
| 1-(cyclohexylmethyl)-3-cyclohexylurea | 50 |
| Dioctylsodium sulfosuccinate | 1 |
| Attapulgite clay | 48 |
| Sodium lignin sulfonate | 1 |

The wettable powder is distributed over the surface of #4 vermiculate by tumbling together. To make the combination more adherent the mix is sprayed with a mixture of ethylene glycol and water. The final ratio of ingredients is as follows:

| | Percent |
|---|---|
| 50% active wettable powder | 4 |
| #4 vermiculite | 86 |
| Ethylene glycol | 5 |
| Water | 5 |

In a modification of the above formulation the ethylene glycol may be replaced by a mixture of the sodium sulfates of mixed long chain alcohol fatty acid esters and diethylene glycol acetate in a ratio between 1:10 and 10:1 by weight.

The granular formulation described above has utility as a pre-emergence treatment for retarding the growth of crabgrass in an area containing established perennial grasses such as Kentucky bluegrass or creeping red fescue. The material is applied with a granule spreader at the rate of 6 pounds of active ingredient per acre prior to the germination of crabgrass. Such excellent retardation of crabgrass is obtained that it presents no competition to the established perennials. The established perennial species exhibit no injury symptoms.

EXAMPLE 9

The following compound is substituted for the dicycloalkylurea in Example 8 in like amount by weight and is formulated and applied in like manner. Like results are obtained.

1-(cyclohexyl)-3-(2-chlorocyclohexyl)urea

EXAMPLE 10

The following wettable powder is suitable for any of the compounds described above which melt above 90° C.:

| | Percent |
|---|---|
| 1-cycloheptyl-3-(cyclohexylmethyl)urea | 50 |
| Diatomaceous silica | 48 |
| Coconut acid ester of sodium isethionate | 1 |
| Sodium lauryl sulfate | 1 |

The ingredients are blended and micropulverized to pass a 60 mesh screen.

This wettable powder formulation in the amount of 8 pounds of active ingredient per acre is added to 80 gallons of water in a spray tank. Six pounds of a surfactant such as trimethylnonyl ether of polyethylene glycol with ethylene oxide is added to this mixture. This tank spray mixture is applied to an area which is infested with Johnson grass and foxtails in the 1 to 2-leaf stage. Excellent retardation of these species is obtained. They turn dark green, show very slow growth and their root systems fail to develop normally.

EXAMPLE 11

The following compound is substituted for the 1-dicycloalkylurea of Example 10 in like amount by weight and is formulated and applied in like manner. Like results are obtained.

1-(cyclopentyl)-3-(cyclohexylmethyl)urea

EXAMPLE 12

| | Percent |
|---|---|
| 1-(cyclopentyl)-3-(3-methylcyclohexyl)urea | 25.00 |
| Hydrated attapulgite clay | 1.75 |
| $Na_2HPO_4$ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which can be diluted with water for spray application.

This liquid dispersion is applied at the rate of 5 to 8 pounds of active ingredient per acre in 40 gallons of water for the regulation of growth of crabgrass and Johnson grass in a planting of arbor vitae and privet. Crabgrass and Johnson grass treated in the 1–3 leaf stage is retarded markedly. Crabgrass and Johnson grass seeds in the soil germinate but the plants fail to make normal growth.

This formulation has utility for the regulation of growth of crabgrass and Johnson grass from seed in an established ryegrass lawn. A rate of 3 to 4 pounds of active ingredient per acre in 40 gallons of water gives excellent retardation of crabgrass and Johnson grass after treatment in the 2-leaf stage. Late germinating seedlings are retarded also.

EXAMPLES 13 TO 25

The following compounds are substituted one at a time for the dicycloalkylurea in Example 12 in like amount. Like results are obtained.

(13) 1-(2-chlorocyclohexyl)-3-(cyclooctyl)urea
(14) 1-cyclohexyl-3-octylurea
(15) 1-[2-(cis),4(trans)-dimethylcyclohexyl]-3-cyclohexylurea
(16) 1-[(trans),4(cis)-dimethylcyclohexyl]-3-cyclohexylurea
(17) 1-cis(2-methylcyclohexyl)-3-cyclopentylurea
(18) 1-trans(2-methylcyclohexyl)-3-cyclopentylurea
(19) 1-cis(3-methylcyclohexyl)-3-cyclopentylurea
(20) 1-trans(3-methylcyclohexyl)-3-cycloheptylurea
(21) 1-cis(4-methylcyclohexyl)-3-cycloheptylurea
(22) 1-trans(4-methylcyclohexyl)-3-cycloheptylurea
(23) 1-(2-methylcyclohexyl)-3-(2-fluorocyclohexyl)urea
(24) 1-(cyclohexyl)-3-(2-iodocyclohexyl)urea
(25) 1-(cyclohexyl)-3-(2,3-dichlorocyclopentyl)urea

EXAMPLE 26

The following wettable powder can be diluted with water and applied as a post-emergence spray or it can be made up as a tank mix in conjunction with 0.2–5 parts of trimethylnonyl polyethylene glycol ether per part of active ingredient:

| | Percent |
|---|---|
| 1-(3-methylcyclohexyl)-3-cyclohexylurea | 84 |
| Montmorillonite clay | 13 |
| Dioctyl sodium sulfosuccinate | 2 |
| Partially desulfonated sodium lignin sulfonate | 1 |

This wettable powder formulation is applied at the rate of 5 pounds of active ingredient in conjunction with 4 pounds of surfactant in 40 gallons of water as a directed post-emergence spray to crabgrass and barnyard grass in the 1 to 3-leaf stage. Excellent retardation of growth of the barnyard grass is obtained. Late germinating seedlings are retarded severely. Upon examination of the weeds, a severe retardation of the root system is noted.

EXAMPLE 27

The following emulsifiable oil can be extended with either oil or water:

| | Percent |
|---|---|
| 1-(cyclohexylmethyl)-3-cyclohexylurea | 15 |
| A blend of polyoxyethylene ethers and oil soluble sulfonates | 5 |
| Alkylated naphthalene (principally alpha-methylnaphthalene) | 70 |
| Dimethylformamide | 10 |

The above components are blended and agitated until a homogeneous mixture is obtained.

This emulsifiable formulation is extended with 80 gallons of diesel oil and applied at the rate of 12 pounds active ingredient per acre to a stone walk infested with crabgrass, foxtails and barnyard grass. Excellent growth regulation of these weeds is obtained. Weed seeds germinating after treatment show severe retardation.

EXAMPLE 28

The following wettable powder is applicable to the low melting solids described in the examples as well as all the high melting solid compounds used in this invention.

| | Percent |
|---|---|
| 1-cyclooctylurea-3-cyclohexylmethylurea | 25.00 |
| Alkylnaphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied pre-emergence at the rate of 5 to 8 pounds of active ingredient per acre in 100 gallons of water for the control of growth of crabgrass in areas containing established Kentucky 31 fescue. Excellent retardation of crabgrass is obtained without noticeable damage to the desirable turf grass.

EXAMPLES 29 TO 33

The following compounds are substituted one at a time for the 1-cyclooctyl-3-cyclohexylmethylurea in Example 28 in like amount by weight and are formulated and applied in like manner. Like results are obtained.

(29) 1-(cyclohexylmethyl)-3-cyclohexylurea
(30) 1-(2-methylcyclopentyl)-3-cyclopentylurea
(31) 1-(chlorocyclopentyl)-3-cyclopentylurea
(32) 1-(dichlorocyclopentyl)-3-cyclopentylurea
(33) 1-(bromocyclopentyl)-3-cyclopentylurea

EXAMPLE 34

*Granular formulation*

The following granular composition is formulated:

| | Percent |
|---|---|
| 1-(2-methylcyclohexyl)-3-cyclohexylurea | 2 |
| 15–30 mesh attaclay granules | 98 |

The active material can be applied to the attaclay granules in several ways. (1) The active material can be dissolved in a volatile solvent such as acetone and sprayed on the tumbling granules, or (2) wettable powder containing the active material can be distributed on the surface of the granules. By moistening with water or a mixture of water and ethylene glycol dusting off is prevented. In other granular formulation, if the melting point of the active ingredient is below about 90° C., the active ingredient can be melted and sprayed over a tumbling mass of preformed clay-, vermiculite-, or similar granules.

This granular formulation is applied pre-emergence with a granule spreader at the rate of 6 to 8 pounds active ingredient per acre for the control of growth of crabgrass and foxtails in an area of established bluegrass-meadow fescue. The crabgrass and foxtails emerge from the soil but fail to grow.

EXAMPLES 35 TO 53

The following compounds are substituted one at a time for the 1-(2-methylcyclohexyl)-3-cyclohexylurea in Example 34 in like amount by weight and are formulated and applied in like manner. Like results are obtained.

(35) 1 - (2 - chlorocyclohexyl) - 3 - (2,3-dichlorocyclohexyl)urea
(36) 1 - (2 - bromocyclohexyl) - 3 - (2,3-dibromocyclohexyl)urea
(37) 1-(cyclohexyl)-3-(norbornyl)urea
(38) 1-(cyclohexyl)-3-(norbornylmethyl)urea
(39) 1-(cycloheptyl)-3-(norbornylmethyl)urea
(40) 1-(2-fluorocyclohexyl)-3-cyclopentylurea
(41) 1-(cyclohexyl)-3-bicyclooctylurea
(42) 1-(cyclopentyl)-3-norbornylurea
(43) 1-(iodocyclopentyl)-3-cyclopentylurea
(44) 1-cyclohexyl-3-(5-chloronorbornyl)urea
(45) 1-cyclopentyl-3-(5-bromonorbornyl)urea
(46) 1-(3-methylcyclohexyl)-3-cyclooctylurea
(47) 1-cyclohexyl-3-cyclooctylurea
(48) 1-(2-methylcyclohexyl)-3-cyclooctylurea
(49) 1 - (2 - methylcyclohexylmethyl)-3-(2-methylcyclohexyl)urea
(50) 1-(3-chlorocyclopentylmethyl)-3-(cyclopentyl)urea
(51) 1-cyclohexyl-3-(1-[2.2.2]-bicyclooctyl)urea
(52) 1-(3-chlorocyclohexylmethyl)-3-(cyclohexyl)urea
(53) 1-(cyclohexyl)-3-(2-fluorocyclohexyl)urea

EXAMPLE 54

*Pellet formulation*

The following pellet formulation is used:

| | Percent |
|---|---|
| 1-(cyclohexylmethyl)-3-cyclohexylurea | 11 |
| Anhydrous sodium sulfate | 10 |
| Mississippi sub-bentonite clay | 33 |
| Kaolin clay | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of 3/32 inch. The extruded strands are conveniently chopped into small pellets as they come out of the extruder die. The pellets are air-dried. After drying the pellets can be easily handled and applied as such. However, they readily soften and disintegrate when mildly agitated in water and can also be applied in water rather than as dry pellets.

EXAMPLES 55 TO 59

The following compounds are substituted one at a time for the 1-(cyclohexylmethyl)-3-cyclohexylurea in Example 54 in like amount by weight and are formulated and applied in like manner. Like results are obtained.

(55) 1-(2-chlorocyclohexyl)-3-cyclohexylurea
(56) 1-(2-bromocyclohexyl)-3-cyclohexylurea
(57) 1-(4-bromocyclohexyl)-3-cyclohexylurea
(58) 1-(dichlorocyclohexyl)-3-cyclohexylurea
(59) 1-(2-iodocyclohexyl)-3-cyclohexylurea
(60) 1-cyclohexyl - 3 - (2,2-dimethylbicyclo[3.2.1]oct-3-yl)urea
(61) 1-cycloheptyl-3-bicyclo-[3.2.1]oct-2-ylurea
(62) 1-cyclooctyl-3-bicyclo[2.2.2]oct-2-ylurea
(63) 1-cyclohexyl-3-bicyclo[2.2.2]oct-2-ylmethylurea
(64) 1-cyclooctyl-3-bicyclo-[3.2.1]oct-2-ylmethylurea

EXAMPLE 65

The following wettable powder formulation is prepared:

| | Percent |
|---|---|
| 1-cycloheptyl-3-cyclohexylmethylurea | 52.6 |
| Pikes Peak clay | 44.4 |
| Aerosol OT–B Na, dioctyl sulfosuccinate | 1.5 |
| Na, lignin sulfonate | 1.5 |

The above components are blended and micropulverized until homogeneous and then reblended.

The formulation described above is applied pre-emergence at the rate of 3 to 6 pounds of active ingredient per acre in 40 gallons of water for the control of foxtails, crabgrass and barnyard grass.

EXAMPLE 66

*High strength composition*

| | Percent |
|---|---|
| 1-cyclohexyl-3-cyclohexylmethylurea | 95.0 |
| Synthetic fine silica | 4.0 |
| Sodium dioctylsulfosuccinate | 0.5 |
| Sodium lignosulfonate | 0.5 |

The composition is prepared by blending the ingredients and passing the mixture through a hammer mill. Instead of the urea shown the other ureas shown in Examples 1, 3, 4, 5, 6, and 7 can be substituted. The high strength composition can be used to prepare formulations such as are shown in Example 8.

EXAMPLE 67

The following composition is prepared by blending the ingredients and wet milling in a ball mill to obtain a uniform dispersion with a particle size less than 20 microns.

| | Percent |
|---|---|
| 1-cyclohexyl-3-cyclohexylmethylurea | 35 |
| Stoddard solvent | 63 |
| Soya lecithin | 2 |

This formulation may be extended with diesel oil. It has utility for the control of Johnson grass seedlings in the 1 to 3 leaf stage as a directed post-emergence application of 3 to 6 pounds of active ingredient per acre in 20 gallons of diesel oil. It retards the development of subsequently germinating Johnson grass.

EXAMPLE 68

A 10–5–5 fertilizer mixture

| | Percent |
|---|---|
| Diammonium phosphate | 10.9 |
| Ammonium sulfate | 36.5 |
| Tankage (4% N) | 15.0 |
| Potassium chloride | 8.4 |
| 1-cyclohexyl-3-cyclohexylmethylurea | 0.6 |
| Limestone | 28.6 |

The above mixture is prepared by blending the ingredients in regular fertilizer blending equipment. An application of 40 pounds of this mixture to 1000 square feet of turf gives a treatment of active ingredient at a rate of 10 pounds per acre. An application of this mixture to established turf before germination of weed grasses will result in good control of crabgrass and other seedling weed grasses, such as foxtail and barnyard grass.

EXAMPLE 69

A 20–10–10 fertilizer mixture

| | Percent |
|---|---|
| Diammonium phosphate | 21.70 |
| Urea | 17.50 |
| Ammonium sulfate | 39.50 |
| Potassium chloride | 16.70 |
| 1-cycloheptyl-3-cyclohexylmethylurea | 0.92 |
| Tankage (4% N) | 3.68 |

This mixture is prepared by blending the ingredients in regular fertilizer blending equipment. An application of this mixture to turf at a rate of 20 pounds per 1000 square feet gives a treatment of 8 pounds per acre of active ingredient. The use of this mixture on turf at the indicated rate will result in good preemergence control of seedling weedy grasses such as crabgrass, barnyard grass and foxtails.

Thirty pounds of this fertilizer mixture gives excellent control of crabgrass in the 2 to 3 leaf stage.

EXAMPLE 70

A 10–5–5 fertilizer chlordane mixture

| | Percent |
|---|---|
| Diammonium phosphate | 10.90 |
| Ureaform (38% N) | 20.00 |
| Tankage (4% N) | 12.50 |
| Potassium chloride | 8.40 |
| 1-cyclohexylmethyl-3-(2-methylcyclohexyl)urea | 0.35 |
| Chlordane | 0.35 |
| Limestone | 47.50 |

This mixture is prepared by blending the ingredients in regular fertilizer blending equipment. An application of this mixture to soil at a rate of 40 pounds per 1000 square feet gives a treatment of 6 pounds per acre of active ingredient. The use of this mixture at the indicated rate will give good pre-emergence control of crabgrass in established Kentucky bluegrass.

EXAMPLE 71

A lightweight 10–5–5 fertilizer

| | Percent |
|---|---|
| Ureaform | 15.8 |
| Ammonium sulfate | 19.0 |
| Potassium chloride | 8.4 |
| 1-cyclohexyl-3-cyclohexylmethylurea | 2.4 |
| Hydrated lime | 1.0 |
| Ferrous sulfate | 1.3 |
| Normal superphosphate | 18.9 |
| Triple superphosphate | 2.6 |
| Vermiculite No. 4 | 27.6 |
| Water | 3.0 |

This mixture is prepared by thoroughly blending the above ingredients in regular fertilizer blending equipment. An application of this mixture to soil at a rate of 10 pounds per 1000 square feet will result in an application of 10.4 pounds per acre of active ingredient.

EXAMPLE 72

Six to twelve pounds of an 80% wettable powder formulation as described above but containing 1-cyclohexyl-3-(2-methylcyclohexyl)urea are blended with sufficient asphalt emulsion and grass seed to plant and stabilize an acre of new highway right-of-way. The grass seed may be one or more of the bluegrasses, fescues, or bentgrasses used for turf. This combination is sprayed on an area of sloping highway right-of-way with the equipment used to apply seed and an asphalt emulsion.

The addition of the substituted urea to the asphalt seed combination provides control of annual weedy grasses such as crabgrass (Digitaria supp.), foxtail (Setaria spp.), barnyard grass (Echinochloa crusgalli), downy bromegrass (Bromus tectorum), and seedling Johnson grass (Sorghum halepense). These weedy grasses often prevent the establishment of a stand of the desirable turf grasses, particularly when the seeding is performed in the spring or summer. The use of this chemical permits the successful seeding of the cool season turf species at any time during the growing season when sufficient water is available for their establishment.

EXAMPLE 73

A combination of cool season turf grass seed and wood fiber, e.g., "Turfiber"®, is used to seed and stabilize new turf areas. The addition to this combination of 6 to 12 pounds of an 80% wettable powder formulation as described above but containing 1-cyclohexyl-3-cyclohexylmethylurea provides control of annual weedy grasses and the same advantages enumerated in Example 69.

The invention claimed is:

1. A plant growth retardant composition comprising a major amount of an inert diluent and an annual grass growth retardant amount of a compound of the formula:

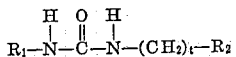

wherein $R_1$ and $R_2$ are separately selected from the group consisting of saturated cycloalkyl of 5 through 8 carbon atoms, saturated bicycloalkyl of 7 through 8 carbon atoms, monomethyl, dimethyl, monohalo, dihalo and monomethyl-monohalo substituted saturated cycloalkyl and bicycloalkyl where the cycloalkyl has 5 through 8 carbon atoms and the bicycloalkyl has 7 through 8 carbon atoms; and $t$ is selected from the group consisting of 0 and 1; with the limitation that when $t$ is 0, $R_1$ and $R_2$ must be different and when $t$ is 0 and additionally $R_1$ and $R_2$ are both unsubstituted cycloalkyl the ring size must differ by more than one carbon atom.

2. Method of selectively controlling seedling weed grasses growing in the presence of other vegetation comprising applying to the locus of growth of said seedling weed grasses in an amount sufficient to retard their growth without corresponding effect on other vegetation, a compound of the formula:

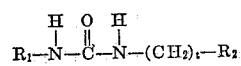

wherein $R_1$ and $R_2$ are separately selected from the group consisting of saturated cycloalkyl of 5 through 8 carbon atoms, saturated bicycloalkyl of 7 through 8 carbon atoms, monomethyl, dimethyl, monohalo, dihalo and monomethyl-monohalo substituted saturated cycloalkyl and bicycloalkyl where the cycloalkyl has 5 through 8 carbon atoms and the bicycloalkyl has 7 through 8 carbon atoms; and $t$ is selected from the group consisting of 0 and 1; with the limitation that when $t$ is 0, $R_1$ and $R_2$ must be different and when $t$ is 0 and additionally $R_1$ and $R_2$ are both unsubstituted cycloalkyl the ring size must differ by more than one carbon atom.

3. Method according to claim 2 wherein the compound applied is 1-cyclopentyl-3-cyclohexylmethylurea.

4. Method according to claim 2 wherein the compound applied is 1-cyclohexyl-3-cyclohexylmethylurea.

5. Method according to claim 2 wherein the compound applied is 1-cycloheptyl-3-cyclohexylmethylurea.

6. Method according to claim 2 wherein the compound applied is 1-cyclooctyl-3-cyclohexylmethylurea.

7. Method according to claim 2 wherein the compound applied is 1-cyclohexyl-3-(2-methylcyclohexyl)urea.

8. Method according to claim 2 wherein the compound applied is 1 - cyclohexyl - 3-(3-methylcyclohexyl) urea.

9. Method according to claim 2 wherein the seedling weed grass is crabgrass.

10. Method according to claim 2 wherein the seedling weed grass is crabgrass and the other vegetation is perennial turf grass.

References Cited

UNITED STATES PATENTS 3,001,861  9/1961  Fischer et al. _____ 71—2.6

LEWIS GOTTS, *Primary Examiner.*

JAMES O. THOMAS, JR., *Examiner.*